United States Patent
Frank et al.

(10) Patent No.: US 11,201,647 B2
(45) Date of Patent: *Dec. 14, 2021

(54) METHOD AND APPARATUS FOR EQUAL ENERGY CODEBOOKS FOR COUPLED ANTENNAS WITH TRANSMISSION LINES

(71) Applicant: Motorola Mobility LLC, Chicago, IL (US)

(72) Inventors: Colin Frank, Park Ridge, IL (US); Tyler Brown, Lake Zurich, IL (US)

(73) Assignee: Motorola Mobility LLC, Chicago, IL (US)

( * ) Notice: Subject to any disclaimer, the term of this patent is extended or adjusted under 35 U.S.C. 154(b) by 1097 days.

This patent is subject to a terminal disclaimer.

(21) Appl. No.: 15/234,552

(22) Filed: Aug. 11, 2016

(65) Prior Publication Data

US 2018/0048367 A1 Feb. 15, 2018

(51) Int. Cl.
*H04B 7/04* (2017.01)
*H04B 7/0456* (2017.01)
*H04W 52/42* (2009.01)
*H04B 7/06* (2006.01)

(52) U.S. Cl.
CPC ......... *H04B 7/0478* (2013.01); *H04B 7/0465* (2013.01); *H04B 7/06* (2013.01); *H04W 52/42* (2013.01)

(58) Field of Classification Search
CPC .. H04B 7/0426; H04B 7/0456; H04B 7/0465; H04B 7/0478; H04B 7/06; H04W 52/42
USPC ........................................................ 375/295
See application file for complete search history.

(56) References Cited

U.S. PATENT DOCUMENTS

| 9,590,706 B1* | 3/2017 | Frank | H04B 7/0417 |
| 9,590,708 B1* | 3/2017 | Frank | H04B 7/0456 |
| 2003/0133403 A1* | 7/2003 | Castelain | H04B 1/62 370/203 |

(Continued)

OTHER PUBLICATIONS

Dictionary.com, Definition of the term "balance" printed Dec. 6, 2019. (Year: 2019).*

(Continued)

*Primary Examiner* — Kevin M Burd
(74) *Attorney, Agent, or Firm* — Loppnow & Chapa; Matthew C. Loppnow

(57) ABSTRACT

A method and apparatus provide equal energy codebooks for coupled antennas with transmission lines. A plurality of precoders can be received from a codebook in a transmitter having an antenna array. Each precoder of the plurality of precoders can be transformed to a transformed precoder such that the transmit power for each transformed precoder is equal to the transmit power for each of other transformed precoders of the plurality of precoders. The transmit power can be expressed as a quadratic form with respect to the corresponding precoder. The quadratic form can be based on a transmission line impedance of a transmission line between a signal source and the antenna array. A signal can be received from the signal source. A transformed precoder of the plurality of transformed precoders can be applied to the signal to generate a precoded signal for transmission over a physical channel. The precoded signal can be transmitted.

22 Claims, 12 Drawing Sheets

(56) References Cited

U.S. PATENT DOCUMENTS

2006/0178783 A1* 8/2006 Herbold .................. H04L 12/10
  700/286
2015/0326293 A1* 11/2015 Lee ...................... H04B 7/0465
  370/329
2016/0344460 A1* 11/2016 Frank .................. H04B 7/0478

OTHER PUBLICATIONS

Jon W. Wallace and Michael A. Jensen, "Mutual Coupling in MIMO Wireless Systems: A Rigorous Network Theory Analysis", IEEE Transactions on Wireless Communication, vol. 3, No. 4, Jul. 2004, pp. 1317-1325.

* cited by examiner

METHOD AND APPARATUS FOR EQUAL ENERGY CODEBOOKS FOR COUPLED ANTENNAS WITH TRANSMISSION LINES

CROSS-REFERENCE TO RELATED APPLICATIONS

This application is related to an application entitled "Method and Apparatus for Optimizing Antenna Precoder Selection with Coupled Antennas," U.S. application Ser. No. 15/016,140, Motorola Mobility docket number MM01141, filed on Feb. 4, 2016, an application entitled "Method and Apparatus for Equal Energy Codebooks for Antenna Arrays with Mutual Coupling," Motorola Mobility docket number MM01601, U.S. application Ser. No. 14/855,693, filed on Sep. 16, 2015, and an application entitled "Method and Apparatus for Equal Energy Codebooks for Antenna Arrays with Mutual Coupling," Motorola Mobility docket number MM02071-US-NP, U.S. application Ser. No. 15/157,754, filed on May 18, 2016, all commonly assigned to the assignee of the present application, which are hereby incorporated by reference.

BACKGROUND

1. Field

The present disclosure is directed to a method and apparatus for equal energy codebooks for coupled antennas with transmission lines.

2. Introduction

Presently, wireless communication devices communicate with other communication devices using wireless signals. Many wireless communication devices have multiple antennas that can transmit more focused signals to a receiving device using antenna beamforming. Multiple telecommunication standards define antenna precoder codebooks to support antenna beamforming and or Multiple-Input/Multiple Output (MIMO) transmission with feedback from the receiver. Telecommunication standards that employ codebooks of precoders include the Third Generation Partnership Project High Speed Packet Access (3GPP HSPA) and Long Term Evolution (LTE) standards, the IEEE 802.11 and 802.16 standards. In all of these standards, the precoders that are defined have the property that each precoding vector has equal L2 norm with the assumption that the precoders are applied to the antenna array in such a way that precoders having equal L2 norm yield antenna patterns with equal power in the far field.

In each of the above telecommunication standards, precoders are used in combination with reference symbol transmissions from a transmitter so that a receiver can evaluate the channel that would result from application of each of the precoders. The receiver applies each of the precoders to the reference symbols in order to evaluate the channel quality. It then signals the index of the best precoder and the corresponding channel quality back to the transmitter. For some transmission modes, the precoder used for the data transmission is signaled to the receiver, which then applies the precoder to estimate the channel for the data symbols.

Implicit in the operation of these types of systems is the assumption that the precoders are applied in a manner such that the antenna pattern corresponding to each precoder has the same transmit power. The reason for this assumption is that it is the objective of the receiver to select the precoder which maximizes its channel quality, and thus the achievable data rate, for a given transmit power. In the case of a single user, this will maximize the transmission range of a fixed data rate, or alternatively, the achievable data rate at a fixed range. Alternatively, for multi-user systems, it is desirable to minimize the transmit power needed to achieve a given data rate for each user, as this transmit power is interference for all users other than the target user.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for equal energy codebooks for coupled antennas with transmission lines. According to a possible embodiment, a plurality of precoders can be received from a codebook in a transmitter having an antenna array. Each precoder of the plurality of precoders can be transformed to a transformed precoder such that the transmit power for each transformed precoder is equal to the transmit power for each of the other transformed precoders of the plurality of precoders. The transmit power can be expressed as a quadratic form with respect to the corresponding precoder. The quadratic form can be based on a transmission line impedance of a transmission line between a signal source and the antenna array. A signal can be received from the signal source. A transformed precoder of the plurality of transformed precoders can be applied to the signal to generate a precoded signal for transmission over a physical channel. The precoded signal can be transmitted.

Figure 1:
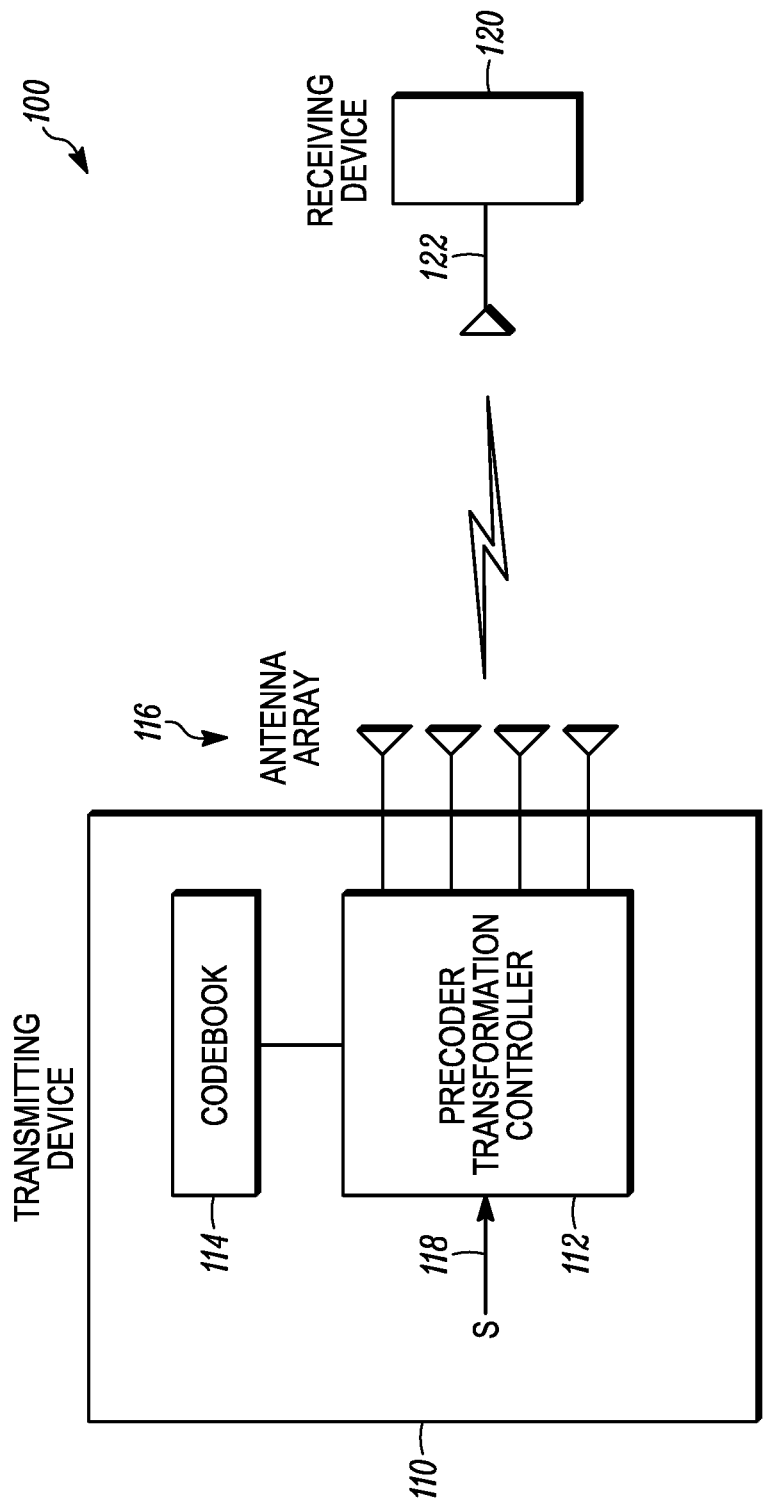
FIG. 1 is an example block diagram of a system according to a possible embodiment.

FIG. 1 is an example block diagram of a system 100 according to a possible embodiment. The system 100 can include a transmitting device 110 and a receiving device 120. The transmitting device 110 can be a User Equipment (UE), a base station, or any other device that can transmit wireless signals. Similarly, the receiving device 120 can be a UE, a base station, or any other device that can receive wireless signals. A UE can be a wireless terminal, a portable wireless communication device, a smartphone, a cellular telephone, a flip phone, a personal digital assistant, a device having a subscriber identity module, a personal computer, a selective call receiver, a tablet computer, a laptop computer, or any other device that is capable of sending and receiving wireless communication signals. A base station can be a wireless wide area network base station, a wireless local area network base station, an enhanced NodeB (eNB), an access point, or any other base station.

The transmitting device 110 can include a precoder transformation controller 112, a codebook 114, and an antenna array 116. The precoder transformation controller 112 can be one element or can be distributed between different elements. For example, the precoder transformation controller 112 can be part of a processor, can be part of a transceiver, can be part of a precoder, can be part of other elements in a transmitting device, and/or can be distributed between combinations of elements in a transmitting device and/or over cloud computing. The receiving device 120 can include at least one antenna 122. For example, in some embodiments the receiving device 120 can have one antenna and in other embodiments the receiving device 120 can have an array of antennas. The transmitting device 110 can also act as a receiving device and the receiving device 120 can also act as a transmitting device depending on which device is currently transmitting or receiving.

If there is no mutual coupling of the antenna array 116, such as a transmit array, then it will be true that antenna precoding vectors having equal L2 norm will yield antenna patterns with equal power (note that some assumptions may be necessary, such as the antennas having equal self-impedance). However, if the antennas of the antenna array 116 are coupled, then the antenna patterns resulting from two precoders having the same L2 norm can differ in transmit power by several dB. The amount of this difference can depend on multiple factors, including the mutual coupling coefficients, the type of source used to drive the array, the source impedance, and/or other factors. The power delivered to the antenna array 116 can depend on relative phases of the inputs of a vector voltage source or a vector current source, on the source impedances, and/or on other factors.

In the case that a transmission line is used between a source of a source signal 118 and the antenna array 116, the transmitted power can vary with the relative phase of the input voltage vector or input source vector, and this variation can further depend on the source impedance, the transmission line impedance, the length of the transmission line, the antenna impedance (and any matching circuitry), and/or other factors. If a transmission line is used between the source and the antenna array 116 in combination with an isolator at the source, the transmitted power can still vary with the relative phase of the input voltage vector or input source vector, but this variation may now depend only on the transmission line impedance, the antenna impedance (and any matching circuitry), and/or other factors so that the power variation may no longer depend on the source impedance or the length of the transmission line.

Embodiments can show that the power variation as a function of the precoder can be expressed as a quadratic form, which is non-negative definite for the cases in which transmission lines are used between a source and an antenna array. Using these quadratic forms for the transmit power, at least two methods can be used for mapping the precoders to antenna patterns with equal transmit power. In a first method, each precoder can be scaled by the inverse square root of the transmit power that results from the unscaled precoder. In the second method, the set of precoders can be transformed by multiplying each precoder by a matrix, so that the resulting set of precoders all map to antenna patterns having the same power. If precoder-based channel estimation is used in combination with common reference symbols, then the same precoder transformation can also be applied to the common reference symbol precoders.

Figure 2:
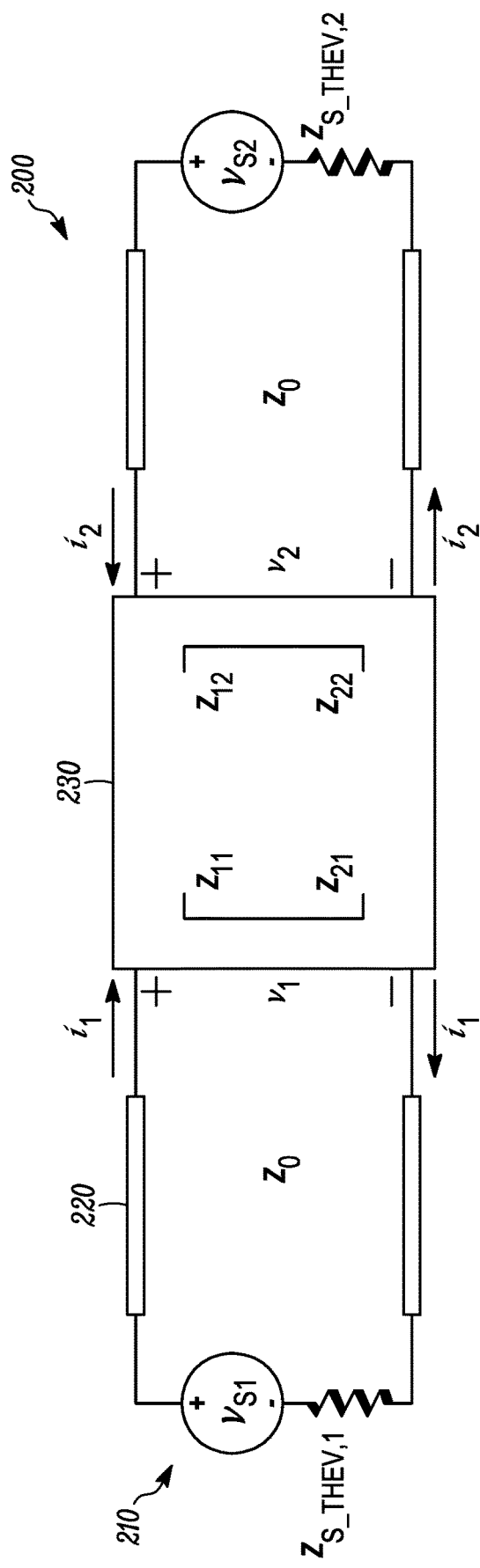
FIG. 2 is an example illustration of a Thevenin source and two-port antenna array model with a transmission line according to a possible embodiment.
Figure 3:
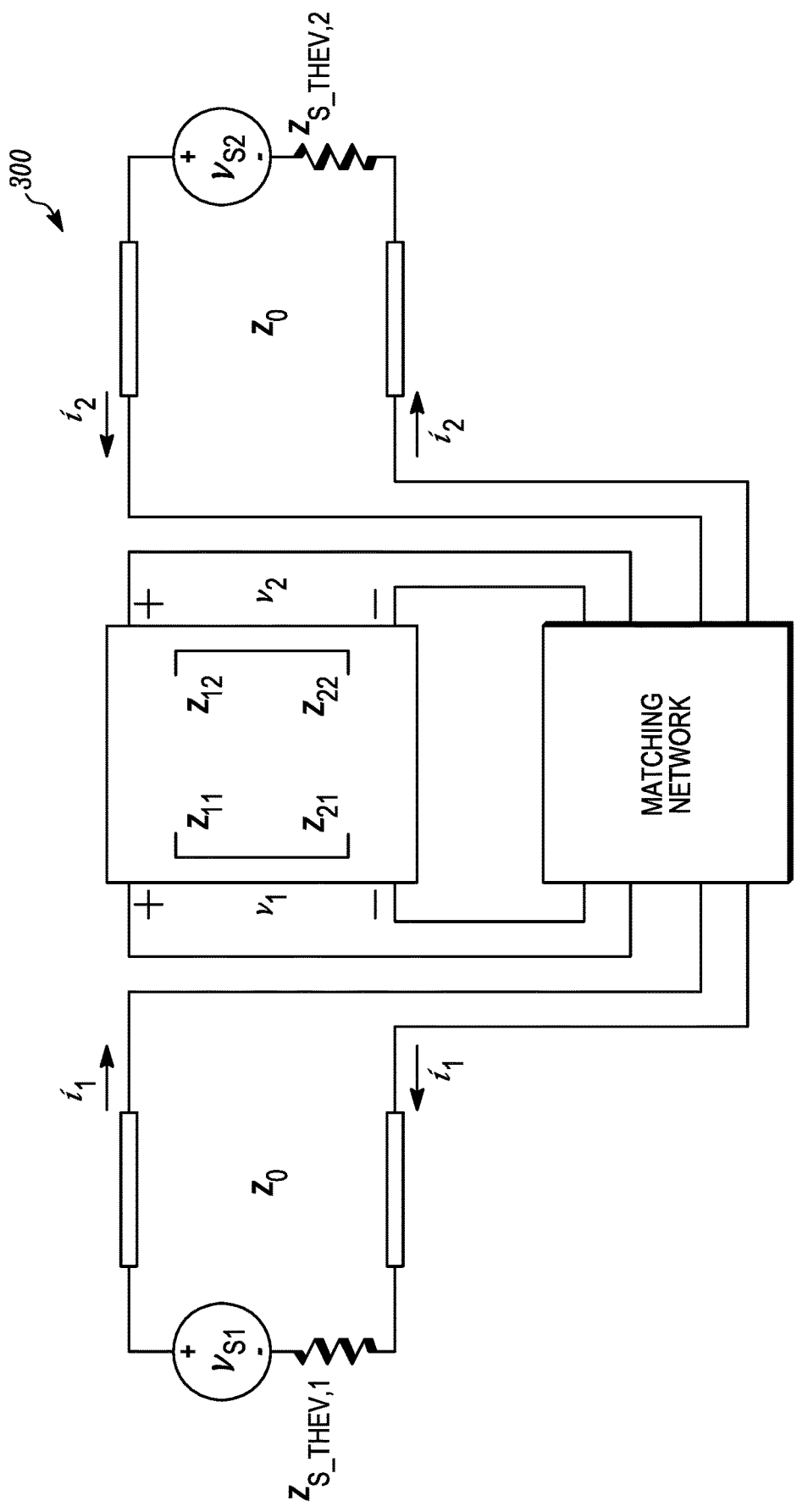
FIG. 3 is an example illustration of a matching network between a Thevenin source and an antenna array with an impedance matrix according to a possible embodiment.
Figure 4:
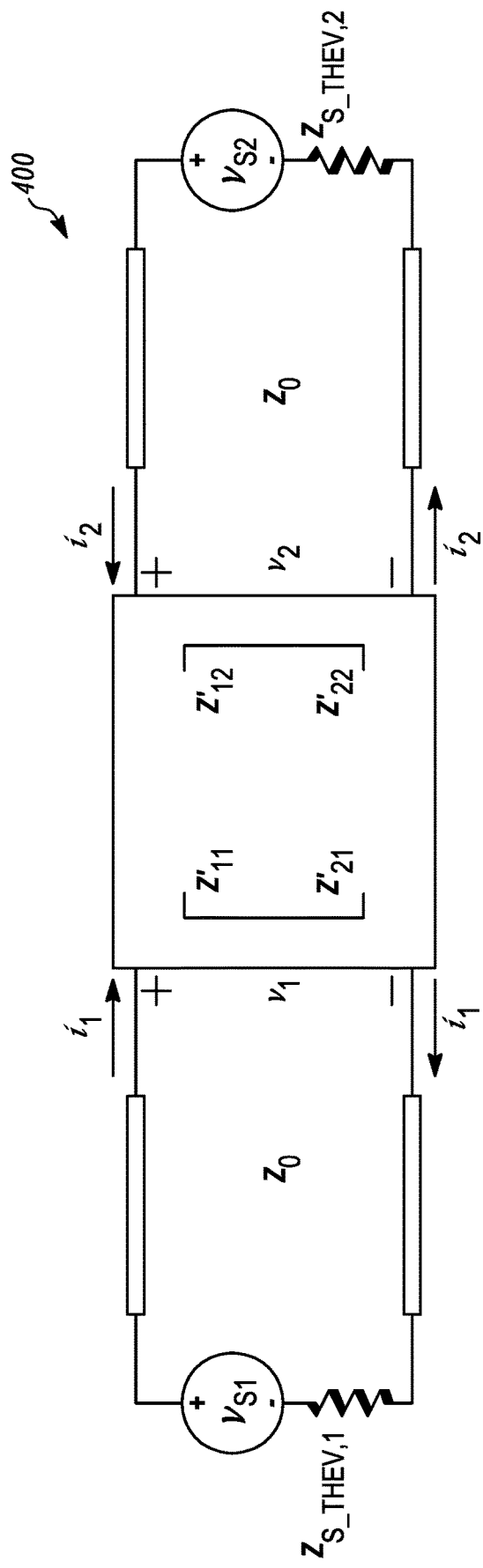
FIG. 4 is an example illustration of a matching network combined with an antenna array with a resulting combined impedance matrix according to a possible embodiment.

FIG. 2 is an example illustration 200 of a Thevenin source and two-port antenna array model with a transmission line according to a possible embodiment. FIG. 3 is an example illustration 300 of a matching network explicitly shown between a Thevenin source and an antenna array with impedance matrix Z according to a possible embodiment. FIG. 4 is an example illustration 400 of a matching network combined with an antenna array with a resulting combined impedance matrix Z' according to a possible embodiment, where the combined impedance matrix Z' can be used instead of the impedance matrix Z in equations herein to account for a matching network.

This embodiment can consider transmit power with a Thevenin Source, transmission lines, and no isolators at the source. For example, the illustration 200 shows an antenna array 230 driven by a Thevenin source 210 with a transmission line 220 between the source 210 and the antenna array 230. This can be used to determine transmit power with a Thevenin source, transmission lines, and no isolators at the source. The Thevenin source 210 can include an ideal vector voltage source $v_s$ in combination with a series impedance $Z_{S\_Thev}$, where $Z_{S\_Thev}$ is a diagonal matrix with diagonal elements equal to the series impedance $Z_{S\_Thev1}$ and $Z_{S\_Thev2}$ for each voltage source $v_{s1}$ and $v_{s2}$, respectively. The impedance looking into a transmission line can be given by $$Z_{in}(l) = Z_0(Z + jZ_0I_2 \tan(2\pi l))(Z_0I_2 + jZ \tan(2\pi l))^{-1},$$

where $Z_0$ can be the impedance of the transmission line, l can be the length of the transmission line in wavelengths, and Z can be the impedance matrix for the combination of the antenna array and any impedance matching circuitry between the transmission line and the antenna array.

The transmit power can be given by $$Re(v_S^H(Z_{S\_Thev}+Z_{in}(l))^{-H}Z_{in}(l)(Z_{S\_Thev}+Z_{in}(l))^{-1}v_S) = v_S^H(Z_{S\_Thev}+Z_{in}(l))^{-H}Re(Z_{in}(l))(Z_{S\_Thev}+Z_{in}(l))^{-1}v_S,$$

where the matrix $Z_{S\_Thev}$ can be a diagonal matrix with elements equal to the source impedances in series with the Thevenin voltage sources. This expression can be further simplified as the quadratic form $$v_S^H(Z_{S\_Thev}+Z_{in}(l))^{-H}Re(Z_{in}(l))(Z_{S\_Thev}+Z_{in}(l))^{-1}v_S = v_S^H Q_{Thev}(Z_{S\_Thev},Z_{in}(l))v_S$$

where $$Q_{Thev}(Z_{S\_Thev}, Z_{in}(l)) = (Z_{S\_Thev} + Z_{in}(l))^{-H} Re(Z_{in}(l))(Z_{S\_Thev} + Z_{in}(l))^{-1}.$$

As an example of a two-element array of half-wavelength dipoles with half-wavelength spacing, the impedance matrix for this array can be given by $$Z = \begin{bmatrix} 73 + j \cdot 42.5 & -13 - j \cdot 25 \\ -13 - j \cdot 25 & 73 + j \cdot 42.5 \end{bmatrix}.$$

The additional following parameters for this example can be assumed as: source impedance=50 ohms; transmission line impedance=50 ohms; and transmission line length=one-quarter wavelength.

A voltage source of the form $v(\theta) = [1 \; exp \; (j\theta)]^T$ can be considered for which the L2 norm of the precoder $v(\theta)$ can be independent of the phase $\theta$, so that $$\|v(\theta)\|^2 = 2$$

for all $\theta$.

Figure 5:
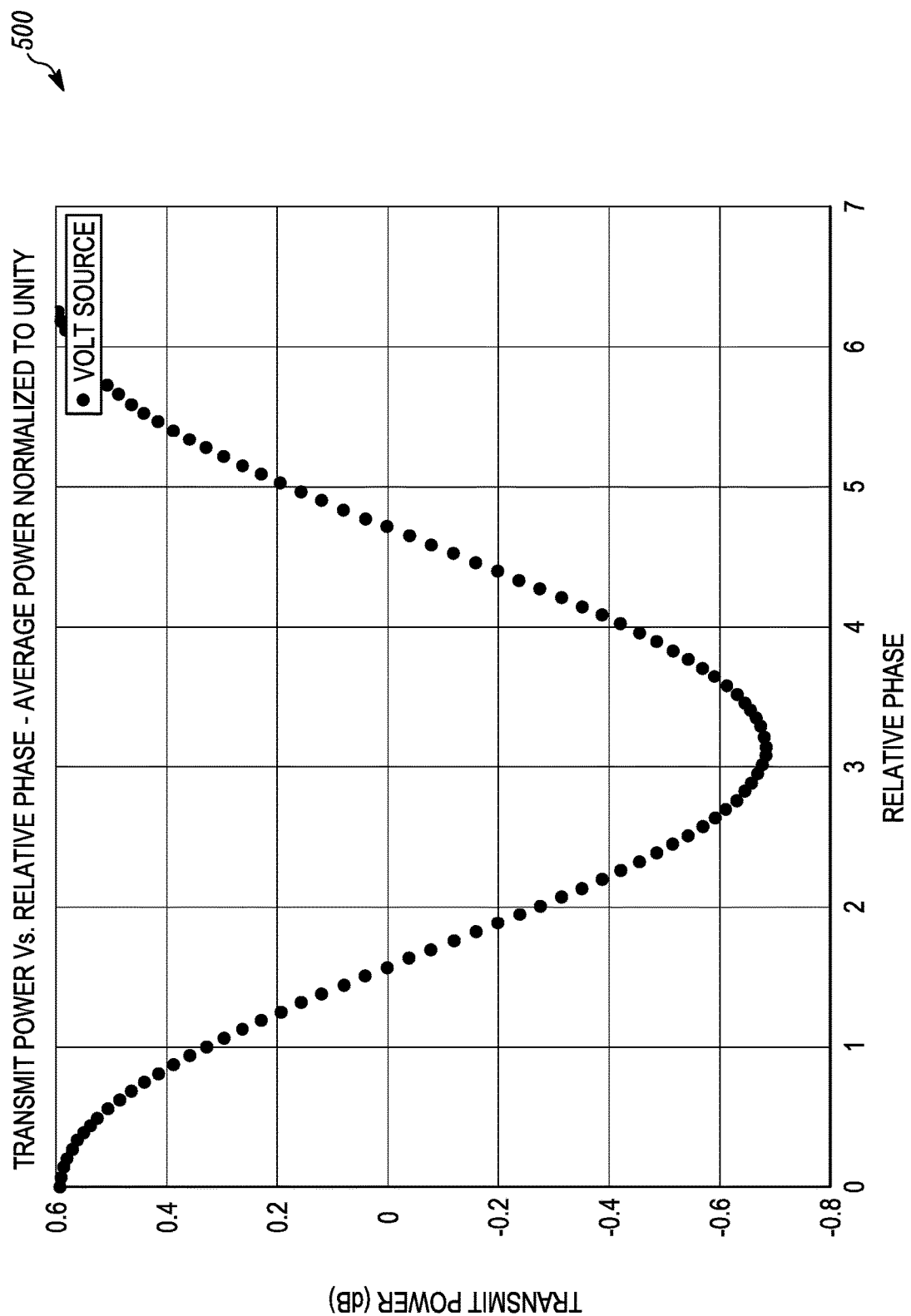
FIG. 5 is an example illustration of variation of transmit power as a function of phase for a two-element dipole array with half-wavelength spacing driven by a 50 ohm Thevenin source and 50 ohm transmission lines according to a possible embodiment.

FIG. 5 is an example illustration 500 of variation of transmit power as a function of phase $\theta$ for a two-element dipole array with half-wavelength spacing driven by a 50 ohm Thevenin source and 50 ohm transmission lines according to a possible embodiment. It can be noted that the transmit power varies by 1.3 dB even though the L2 norm of the precoder is held constant.

Figure 6:
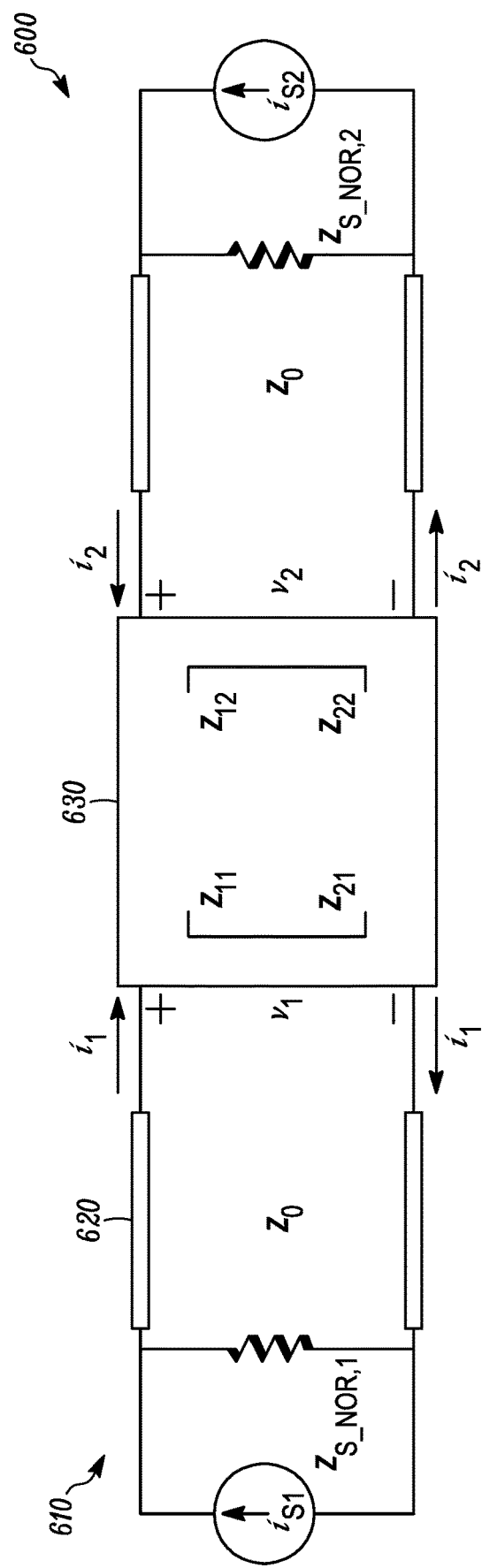
FIG. 6 is an example illustration of a Norton source and two-port antenna model with a transmission line according to a possible embodiment.
Figure 7:
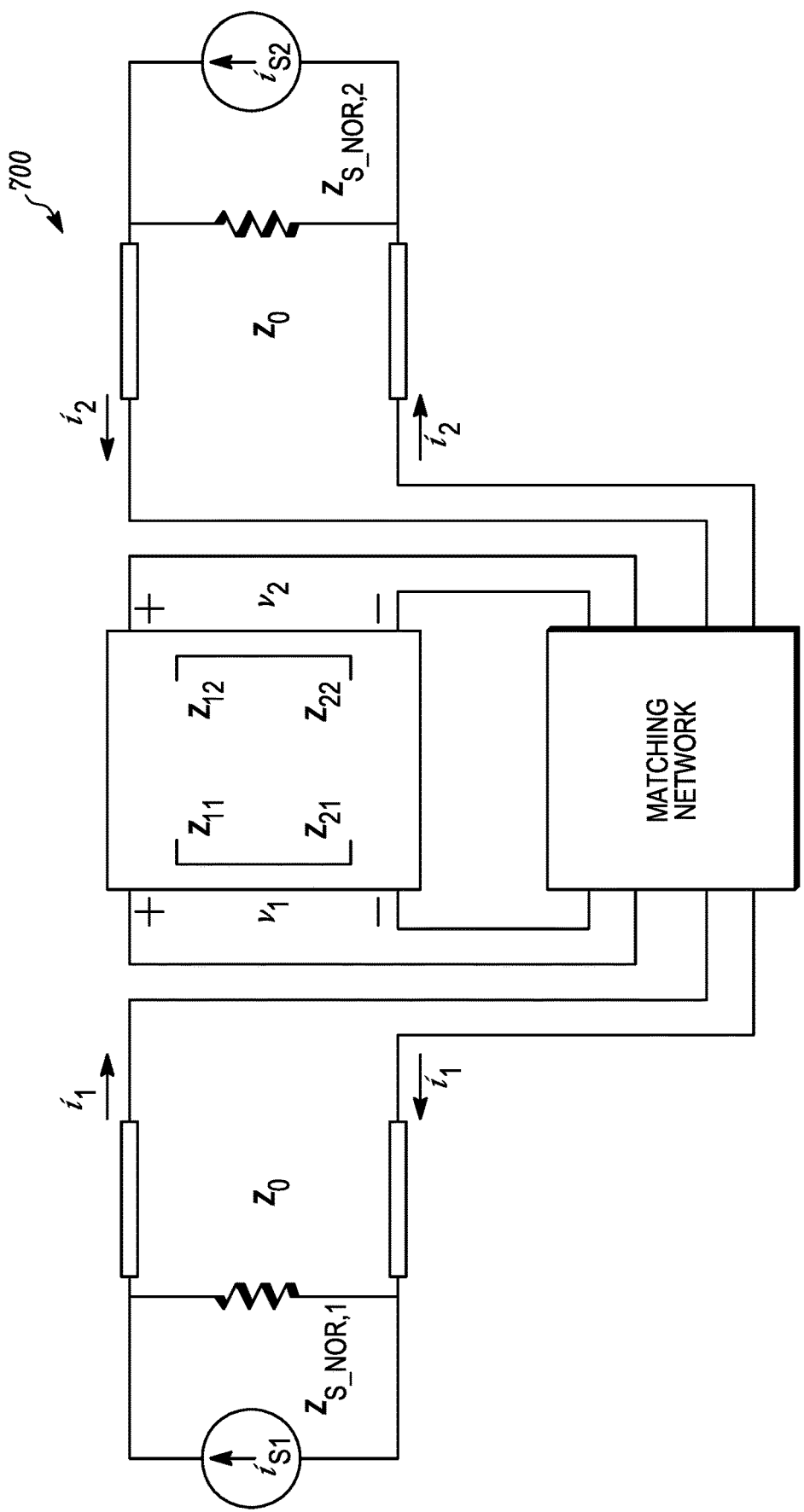
FIG. 7 is an example illustration of a matching network between a Norton source and an antenna array with an impedance matrix according to a possible embodiment.
Figure 8:
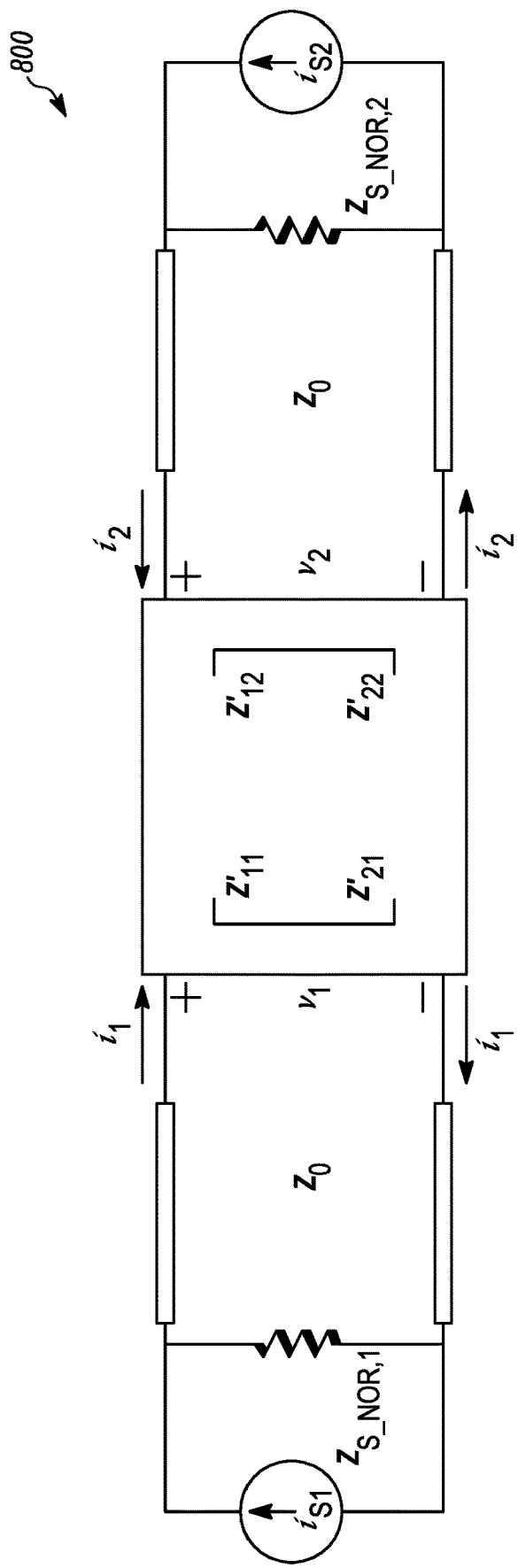
FIG. 8 is an example illustration of a matching network combined with an antenna array with a resulting combined impedance matrix according to a possible embodiment.

FIG. 6 is an example illustration 600 of a Norton source and two-port antenna model with a transmission line according to a possible embodiment. FIG. 7 is an example illustration 700 of a matching network explicitly shown between a Norton source and an antenna array with impedance matrix Z according to a possible embodiment. FIG. 8 is an example illustration 800 of a matching network combined with an antenna array with a resulting combined impedance matrix Z' according to a possible embodiment, where the combined impedance matrix Z' can be used instead of the impedance matrix Z in equations herein to account for a matching network.

According to this embodiment, the transmit power with a Norton source 610, transmission lines 620, an antenna array 630, and no isolators at the source 610, the impedance looking into a transmission line can be given by $$Z_{in}(l) = Z_0 (Z + jZ_0 I_2 \tan(2\pi l))(Z_0 I_2 + jZ \tan(2\pi l))^{-1},$$

where $Z_0$ can be the impedance of the transmission line, l can be the length of the transmission line in wavelengths, and Z can be the impedance matrix for the combination of the antenna array and any impedance matching circuitry between the transmission line and an antenna array.

The transmit power can be given by $$Re(i_S^H Z_{S\_Nor}^H (Z_{S\_Nor} + Z_{in}(l))^{-H} Z_{in}(l)(Z_{S\_Nor} + Z_{in}(l))^{-1} Z_{S\_Nor} i_S = i_S^H (Z_{S\_Nor} + Z_{in}(l))^{-H} Re(Z_{in}(l)) (Z_{S\_Nor} + Z_{in}(l))^{-1} Z_{S\_Nor} i_S,$$

where the matrix $Z_{S\_Nor}$ can be a diagonal matrix with elements equal to the shunt source impedances in parallel with the Norton current sources. This expression can be further simplified as the quadratic form $$i_S^H (Z_{S\_Nor}^H (Z_{S\_Nor} + Z_{in}(l))^{-H} Re(Z_{in}(l))(Z_{S\_Nor} + Z_{in}(l))^{-1} Z_{S\_Nor}) i_S = i_S^H Q_{Nor}(Z_{S\_Nor}, Z_{in}(l)) i_S$$

where $$Q_{Nor}(Z_{S\_Nor}, Z_{in}(l)) = Z_{S\_Nor}^H (Z_{S\_Nor} + Z_{in}(l))^{-H} Re(Z_{in}(l))(Z_{S\_Nor} + Z_{in}(l))^{-1} Z_{S\_Nor}.$$

According to a possible embodiment for transmit power with a Thevenin source, transmission lines, and isolators at the source, when the isolator is used at the source, the transmitter does not see the voltage and current reflected from the antenna array (and any matching circuitry). Instead, the reflected voltage and current are routed away from the transmitter and into a matched load. As a result, the impedance looking into the transmission line can just be the transmission line impedance $Z_0$ and thus may not depend on the impedance of the antenna array.

For a Thevenin source, the forward voltage wave into the transmission line can be given by $$V^+ = Z_0 Z_S^{-1} v_S.$$

At the antenna array load, the reflected voltage wave can be given by $$V^- = (Z + Z_0 I_2)^{-1}(Z - Z_0 I_2)V^+,$$
$$= SV^+$$

where S can be the scattering matrix given by $$S = (Z + Z_0 I_2)^{-1}(Z - Z_0 I_2).$$

The total voltage at the load can be given by $$V_{tot} = V^+ + V^- = (I_2 + S)V^+$$
$$= Z_0 (I_2 + S) Z_{S\_Thev}^{-1} v_S.$$

The total current at the load can be given by $$I_{tot} = I^+ + I^- = Z_0^{-1}(V^+ - V^-)$$
$$= Z_0^{-1}(I_2 - S)V^+$$
$$= Z_0^{-1}(I_2 - S) Z_0 Z_{S\_Thev}^{-1} v_S$$
$$= (I_2 - S) Z_{S\_Thev}^{-1} v_S.$$

The power delivered to the load can then be given by the quadratic form $$Re(V_{tot}^H I_{tot}) = Z_0 Re\left(v_S^H Z_{S\_Thev}^{-H}(I_2 + S)^H (I_2 - S) Z_{S\_Thev}^{-1} v_S\right)$$
$$= Z_0 Re(v_S^H Z_{S\_Thev}^{-H}(I_2 - S^H S - 2Im(S)) Z_{S\_Thev}^{-1} v_S)$$
$$= Z_0 v_S^H Z_{S\_Thev}^{-H}(I_2 - Re(S^H S)) Z_{S\_Thev}^{-1} v_S.$$

In the event that the source impedances are equal, this expression for the transmitted power can be expressed as $$Re(V_{tot}^H I_{tot}) = \frac{Z_0}{|Z_{S\_Thev}|^2} v_S^H (I_2 - Re(S^H S)) v,$$

or more simply as $$Re(V_{tot}^H I_{tot}) = v_S^H Q_{Thev\_iso}(Z_0, Z_{S\_Thev}, S) v,$$

where $$Q_{Thev\_iso}(Z_0, Z_{S\_Thev}, S) = \frac{Z_0}{|Z_{S\_Thev}|^2}(I_2 - Re(S^H S)).$$

Figure 9:
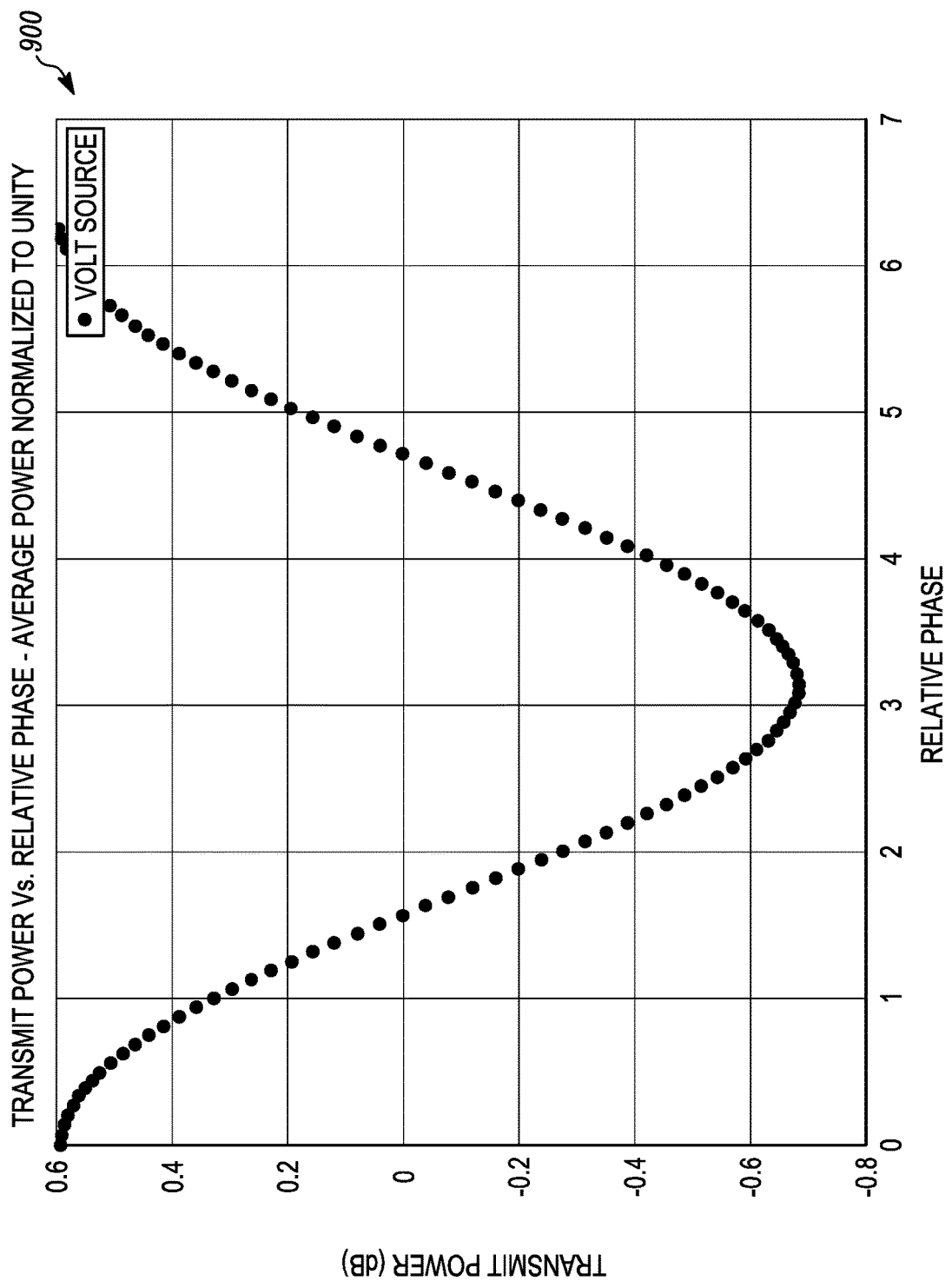
FIG. 9 is an example graph of variation of transmit power as a function of phase for a two-element dipole array with half-wavelength spacing driven by a 50 ohm Thevenin source with isolators and 50 ohm transmission lines according to a possible embodiment.

FIG. 9 is an example graph 900 of variation of transmit power as a function of phase for a two-element dipole array with half-wavelength spacing driven by a 50 ohm Thevenin source with isolators and 50 ohm transmission lines according to a possible embodiment. The same example as previously given of a two-element array of half-wavelength dipoles with half-wavelength spacing can be considered. The impedance matrix for this array can be given by $$Z = \begin{bmatrix} 73 + j \cdot 42.5 & -13 - j \cdot 25 \\ -13 - j \cdot 25 & 73 + j \cdot 42.5 \end{bmatrix}.$$

As before, the transmission line impedance can be assumed as 50 ohms and a voltage source of the form $v(\theta) = [1 \ \exp(j\theta)]^T$ for which the L2 norm of the precoder $v(\theta)$ is independent of the phase $\theta$ can be considered so that $$\|v(\theta)\|^2 = 2$$

for all $\theta$.

For this example, the variation of the transmit power as a function of the phase is shown in the graph 900. It can be noted that the transmit power varies by 1.3 dB even though the L2 norm of the precoder is held constant.

According to a possible embodiment for transmit power with a Norton source, transmission lines, and isolators at the source, when an isolator is used at the source, the transmitter does not see the voltage and current reflected from the antenna array (and any matching circuitry). Instead, the reflected voltage and current are routed away from the transmitter and into a matched load. As a result, the impedance looking into the transmission line can just be the transmission line impedance $Z_0$ and thus may not depend on the impedance of the antenna array.

For a Norton source, the forward voltage wave into the transmission line can be given by $$V^+ = (Z_0 I_2 + Z_{S\_Nor})^{-1} Z_0 Z_{S\_Nor} i_S.$$

As in the previous case, the antenna array load, the reflected voltage wave can be given by $$V^- = (Z + Z_0 I_2)^{-1}(Z - Z_0 I_2)V^+$$
$$= SV^+,$$

where S can be the scattering matrix given by $$S = (Z + Z_0 I_2)^{-1}(Z - Z_0 I_2).$$

The total voltage at the load can be given by $$V_{tot} = V^+ + V^-$$
$$= (I_2 + S)V^+$$
$$= Z_0(I_2 + S)(Z_0 I_2 + Z_{S\_Nor})^{-1} Z_{S\_Nor} i_S.$$

The total current at the load can be given by $$I_{tot} = I^+ + I^-$$
$$= Z_0^{-1}(V^+ - V^-)$$
$$= Z_0^{-1}(I_2 - S)V^+$$
$$= Z_0^{-1}(I_2 - S)(Z_0 I_2 + Z_{S\_Nor})^{-1} Z_0 Z_{S\_Nor} i_S$$
$$= (I_2 - S)(Z_0 I_2 + Z_{S\_Nor})^{-1} Z_{S\_Nor} i_S.$$

The power delivered to the load can then be given by the quadratic form $$Re(V_{tot}^H I_{tot}) = Z_0 Re(i_S^H Z_{S\_Nor}^H (Z_0 I_2 + Z_{S\_Nor})^{-H}(I_2 + S)^H (I_2 - S)$$
$$(Z_0 I_2 + Z_{S\_Nor})^{-1} Z_{S\_Nor} i_S)$$
$$= Z_0 Re(i_S^H Z_{S\_Nor}^H (Z_0 I_2 + Z_{S\_Nor})^{-H}(I_2 - S^H S - 2Im(S))$$
$$(Z_0 I_2 + Z_{S\_Nor})^{-1} Z_{S\_Nor} i_S)$$
$$= Z_0 i_S^H Z_{S\_Nor}^H (Z_0 I_2 + Z_{S\_Nor})^{-H}(I_2 - Re(S^H S))$$
$$(Z_0 I_2 + Z_{S\_Nor})^{-1} Z_{S\_Nor} i_S.$$

In the event that the source impedances are equal, this expression for the transmitted power can be expressed as $$Re(V_{tot}^H I_{tot}) = \frac{Z_0 |Z_{S\_Nor}|^2}{|Z_0 + Z_{S\_Nor}|^2} i_S^H (I_2 - Re(S^H S)) i$$

or more simply as $$Re(V_{tot}^H I_{tot}) = i_S^H Q_{Nor\_iso}(Z_0, Z_{S\_Nor}, S) i,$$

where $$Q_{Nor\_iso}(Z_0, Z_{S\_Nor}, S) \frac{Z_0 |Z_{S\_Nor}|^2}{|Z_0 + Z_{S\_Nor}|^2}(I_2 - Re(S^H S)).$$

According to a possible embodiment for power variation of precoders with equal Euclidean norm, in the four cases above, the transmit power can be expressed as a quadratic form with respect to the currents or voltages used to drive the antenna arrays. It is apparent that even if the Euclidean norm of the precoder is held constant, the transmit power can vary as a function of the relative phases of the input voltages or input currents. As a result, the implicit assumption used in the design of the 3GPP LTE and IEEE 802.16 codebooks—that precoders with equal Euclidean norm map to antenna patterns with equal transmit power—is incorrect when the antennas are coupled and transmission lines are used between the transmitter and the antenna array.

Two methods can be used for mapping precoders with equal Euclidean norm to antenna patterns with equal power. In a first method, a separate real-valued scaling can be applied to each precoder so that the transmit powers are equalized. For example, for the case in which a Thevenin source is used to drive the array and an isolator is used at the transmitter, the transmit power can be given by $$Re(V_{tot}^H I_{tot}) = v_S^H Q_{Thev\_iso}(Z_0, Z_{S\_Thev}, S) v.$$

In order to equalize the transmit power for precoders having equal Euclidean norm, a precoder $v_k$ can be normalized into a normalized precoder $v_{k,norm}$ by defining $v_{k,norm}$ as $$v_{k,norm} = \frac{\alpha v_k}{(v_k^H Q_{Thev\_iso}(Z_0, Z_{S\_Thev}, S) v_k)^{1/2}},$$

where $\alpha$ is a constant that is the same for all precoders. It should be noted that some equivalent variables in equivalent equations throughout this disclosure may be different for ease of description in the corresponding sections. In this method, the receiver should know the scaling factor applied to each precoder. In particular, the scaling factor for each precoder should be signaled to the receiver. So, for the k-th precoder, the scaling factor $$\frac{\alpha v_k}{(v_k^H Q_{Thev\_iso}(Z_0, Z_{S\_Thev}, S) v_k)^{1/2}}$$

can be sent to the receiver. There are other ways to signal the scaling information to the receiver. For example, the parameter $\alpha$ and the matrix $$Q_{Thev\_iso}(Z_0, Z_{S\_Thev}, S)$$

can be signaled to the receiver. Since the matrix $Q_{Thev\_iso}$ can be Hermitian, the matrix coefficients can be signaled to the receiver in the form of Mx(M−1)/2 complex values and M real values, where M can be the number of transmit antennas.

For a second method, a transformation can be performed on the set of equal Euclidean norm precoders so that the transformed precoders can all map to antenna patterns with equal power. For this reason, the matrix $Q_{Thev\_iso}$ can be factored as $$Q_{Thev\_iso}(Z_0, Z_{S\_Thev}, S) = P P^H,$$

where this factorization can be non-unique. One factorization of this type is the Cholesky factorization where the matrix P can be lower triangular (and thus $P^H$ can be upper triangular). Other factorizations having this form can be generated by noting that because $Q_{Thev\_iso}$ can be Hermitian, the eigendecomposition of $Q_{Thev\_iso}$ can have the form $$Q_{Thev\_iso} = U \Lambda U^H,$$

where the columns of U can be the eigenvectors of $Q_{Thev\_iso}$ and the matrix $\Lambda$ can be diagonal. The diagonal elements of $\Lambda$ can be the eigenvalues corresponding to the eigenvectors of $Q_{Thev\_iso}$, where the eigenvalues in $\Lambda$ can be in the same order as the corresponding eigenvectors in U. Using this eigendecomposition, the following can be defined:

$$P = U \Lambda^{1/2},$$

where $\Lambda^{1/2}$ is the square root of the matrix $\Lambda$. It can be noted that the eigendecomposition of the matrix $Q_{Thev\_iso}$ may not be unique since the eigenvectors forming the columns of U can be placed in any order. If the dimension of $Q_{Thev}$ is M×M, then $Q_{Thev\_iso}$ has M eigenvectors and there are M factorial (M!=M*(M−1)*(M−2)* ... *1) possible orderings of these eigenvectors. Also, given the matrix U and the diagonal matrix of the corresponding eigenvalues $\Lambda$, the square root matrix $\Lambda^{1/2}$ can be non-unique since each eigenvalue has both a positive and a negative square root (all of the eigenvalues of $Q_{Thev\_iso}$ are non-negative). Thus, given the matrix $\Lambda$, there can be $2^M$ possible matrices $\Lambda^{1/2}$.

However, given the matrix A there is only one matrix $\Lambda^{1/2}$ for which all of the values are non-negative and this can be referred to as the positive square root.

For the remainder of this section, the following definition can be used:

$$P = U \Lambda^{1/2},$$

where $\Lambda^{1/2}$ can be the positive square root of the matrix A. The ordering of the eigenvectors of $Q_{Thev\_iso}$ within the columns of U may not matter, though the ordering of the eigenvalues in $\Lambda$ should correspond to the ordering of the eigenvectors in U. It can be noted that because the eigenvectors are orthonormal, it follows that $$P^{-H} = U \Lambda^{-1/2}.$$

Now define $$v_s = P^{-H} w$$
$$= U \Lambda^{-1/2} w,$$

so that $v_S$ is the sum of the projections of w onto the eigenvectors of $Q_{Thev\_iso}$ scaled by the inverse square root of the corresponding eigenvalues. Note that $$v_S^H Q_{Thev} v_S = w^H P^{-1} Q_{Thev\_iso} P^{-H} w$$
$$= w^H P^{-1} P P^H P^{-H} w$$
$$= w^H w$$
$$= \|w\|_2^2.$$

So long as the reference symbol precoders use the same transformation as the data symbol precoders, the receiver can use the existing precoders to estimate the channel, and the receiver does not need to know the precoder transformation that was used at the transmitter. Thus, if each precoder w is transformed into a voltage vector $v_S$ using the transformation $v_S = P_{Thev}^{-H} w$, all of the precoders can map to equal energy patterns so long as all of the precoders have the same $L^2$ norm.

Methods described for mapping equal Euclidean norm precoders to antenna patterns with equal power can be used for all four of the cases given above in which the transmit power is quadratic with respect to the vector voltage (for a Thevenin source) or vector current (for a Norton source). Therefore, embodiments can be applied at least for the following four cases considered in this description: transmit power with a Thevenin source, transmission lines, and no isolators at the source; transmit power with a Norton source, transmission lines, and no isolators at the source; transmit power with a Thevenin source, transmission lines, and isolators at the source; and transmit power with a Norton source, transmission lines, and isolators at the source.

Figure 10:
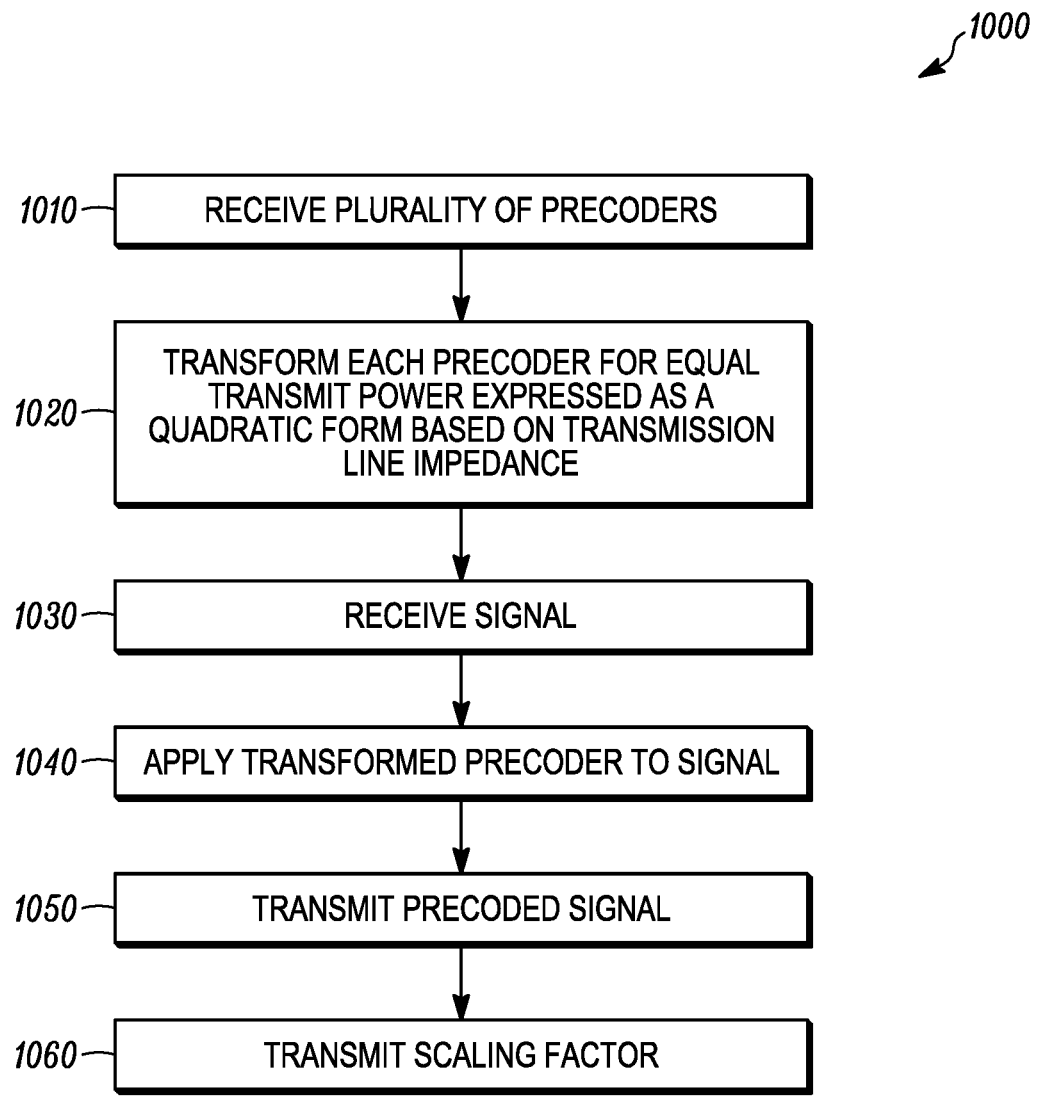
FIG. 10 is an example flowchart illustrating the operation of a wireless communication device according to a possible embodiment.

FIG. 10 is an example flowchart 1000 illustrating the operation of a wireless communication device, such as the device 110 and/or the device 120, according to a possible embodiment. For example, the method of the flowchart 1000 can be used in cases where transmission lines are used without isolators, in cases where isolators are used at a source of the signal for transmission along with transmission lines, and other cases. At 1010, a plurality of precoders can be received from a codebook in a transmitter having an antenna array.

At 1020, each precoder of the plurality of precoders can be transformed to a transformed precoder such that the transmit power for each transformed precoder is equal to the transmit power for each of other transformed precoders of the plurality of precoders. The transmit power can be expressed as a quadratic form with respect to the corresponding precoder. The quadratic form can be non-negative definite. The quadratic form can be based on a transmission line impedance of a transmission line between a signal source and the antenna array. The quadratic form can also be based on an impedance matrix of the antenna array. This can be used both when isolators are used at a source of the signal for transmission and also when isolators are not used. The quadratic form can also be based on a matching network between the signal source and the antenna array. A matching network can transform the impedance matrix of the antenna array to improve the power transfer between the source and the antenna array. The quadratic form can further be based on an impedance of the antenna array, a signal source impedance, and length of the transmission line. For example, the quadratic form may be based on the length of the transmission line when isolators are not used at the signal source. Additionally, the quadratic form can be a function of the transmission line impedance of a transmission line between the signal source and the antenna array, an impedance of a source of the signal for transmission, an impedance matching network, a scattering matrix, and other information, where the quadratic form can be a function of some or all of the information.

The transformation can equalize the transmit power for all of the plurality of precoders. Transforming can also transform the precoders to equal energy precoders when transmission lines are used between a source of the signal and the antenna array. Furthermore, both data symbol precoders and reference symbol precoders can be transformed by the same transformation.

Each precoder can be transformed by scaling each precoder by an inverse square root of a transmit power that results from the corresponding precoder before scaling is applied. Scaling can include normalizing a precoder into a normalized precoder based on the quadratic form. For example, scaling can include normalizing a precoder $w_k$, into a normalized precoder $v_{S,norm}$ based on $$v_{S,norm} = \frac{\alpha w_k}{(w_k^H Q_{Thev\_iso}(Z_0, Z_{S\_Thev}, S)w_k)^{1/2}},$$

where $\alpha$ can be a constant that is the same for all precoders and $Q_{Thev\_iso}$ can be a matrix that can be a function of a scattering matrix S, an impedance $Z_{S\_Thev}$ of a source of the signal for transmission, and a transmission line impedance $Z_0$ of the transmission line. The scattering matrix S can be a function of the impedance matrix of the antenna array. This equation can cover the case in which a Thevenin source model is used with isolators. Other similar equations can cover other cases, such when a Norton source model is used, when an isolator is not used, and other cases.

Scattering parameters may or may not be used for the case in which no isolators are used at the source. Scattering parameters can depend on the transmission line impedance, the antenna impedance, and any matching circuitry. If isolators are used at the source, the quadratic form for the transmit power can be based on only the scattering parameters without individual knowledge of the transmission line impedance and the impedance matrix of the antenna array. In the case with no isolators at the source, the transmission line impedance and the antenna array impedance can be used separately. In the case that isolators are used at the source, a power variation may only depend on a scattering matrix without the need for the additional knowledge of the transmission line impedance and the antenna array impedance separately.

Also or alternately, each precoder can be transformed by multiplying each precoder by a transformation matrix such that the resulting set of precoders each map to antenna patterns having the same power. The transformation matrix can be based on an impedance matrix of the antenna array seen at the signal source as a function of the transmission line length, the transmission line impedance, and an impedance of the antenna array. The transmission line length can be measured in wavelengths. The transformation matrix can also be based on a diagonal matrix of transmitter source impedances. As an example for a Thevenin source model, the transmitter can include a transmitter source of the signal for transmission and the transformation can be based on $$v_S = P_{Thev}^{-H} w,$$

where w can be a precoder from a set of precoders, $v_S$ can be the transformed precoder in terms of voltage, and $P_{Thev}$ can be based on $$Q_{Thev} = P_{Thev} P_{Thev}^H,$$

where $$Q_{Thev}(Z_{S\_Thev}, Z_{in}(l)) = (Z_{S\_Thev} + Z_{in}(l))^{-H} Re(Z_{in}(l)) (Z_{S\_Thev} + Z_{in}(l))^{-1},$$

where l can be a transmission line length measured in wavelengths, $Z_{S\_Thev}$ can be a diagonal matrix of transmitter source impedances, and $Z_{in}$ can be the impedance matrix of the antenna array seen at the source as a function of the transmission line length, the transmission line impedance, and an impedance of the antenna array. $v_S$ can be a two element vector including two source voltages $v_{s1}$ and $v_{s2}$. This equation can be used for a Thevenin source model where another similar equation can be used for a Norton source model.

As an example for a Norton source model, the transmitter can include a transmitter source of the signal for transmission and the transformation can be based on $$i_S = P_{Not}^{-H} w,$$

where w can be a precoder from a set of precoders, i can be the transformed precoder, and $P_{Nor}$ can be based on $$Q_{Not} = P_{Not} P_{Not}^H,$$

where $$Q_{Nor}(Z_{S\_Nor}, Z_{in}(l)) = Z_{S\_Not}^H (Z_{S\_Nor} \pm Z_{in}(l))^{-H} Re(Z_{in}(l)) (Z_{S\_Nor} + Z_{in}(l))^{-1} Z_{S\_Nor},$$

where l can be a transmission line length measured in wavelengths, $Z_{S\_Nor}$ can be a diagonal matrix of transmitter source impedances, and $Z_{in}$ can be the impedance matrix of the antenna array seen at the source as a function of the transmission line length, the transmission line impedance, and an impedance of the antenna array.

At 1030, a signal can be received from the signal source. At 1040, a transformed precoder of the plurality of transformed precoders can be applied to the signal to generate a precoded signal for transmission over a physical channel. At 1050, the precoded signal can be transmitted. At 1060, a scaling factor used for the scaling can be transmitted.

Figure 11:
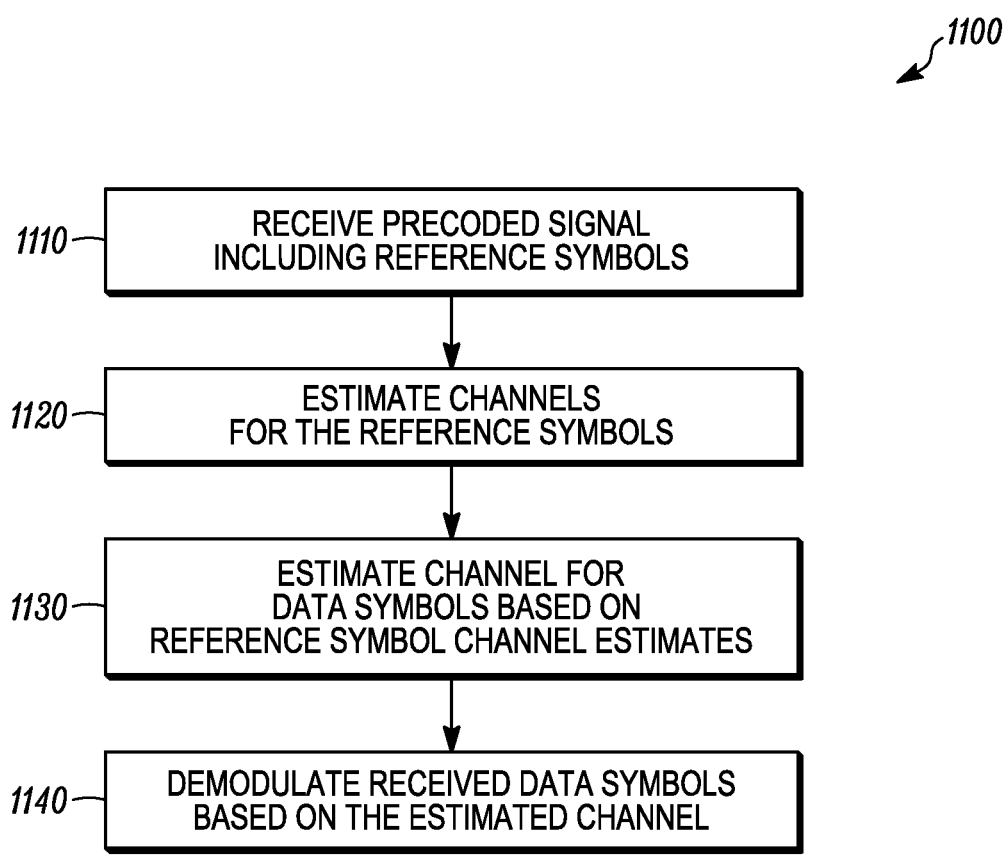
FIG. 11 is an example flowchart illustrating the operation of a wireless communication device according to a possible embodiment.

FIG. 11 is an example flowchart 1100 illustrating the operation of a wireless communication device, such as the device 110 and/or the device 120, according to a possible embodiment. At 1110, a precoded signal including reference symbols can be received. At 1120, channels for the reference symbols can be estimated. At 1130, a channel for the data symbols can be estimated by taking an inner product of a conjugate of a data symbol precoder and the reference symbol channel estimates. The channel estimate for the reference symbols and the data symbols can be performed when the antenna array is used to receive precoded signals. For example, when a device including the antenna array is transmitting, it can transmit precoded signals and when the device is receiving, it can receive precoded signals. At 1140, received data symbols can be demodulated based on the estimated channel It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 12:
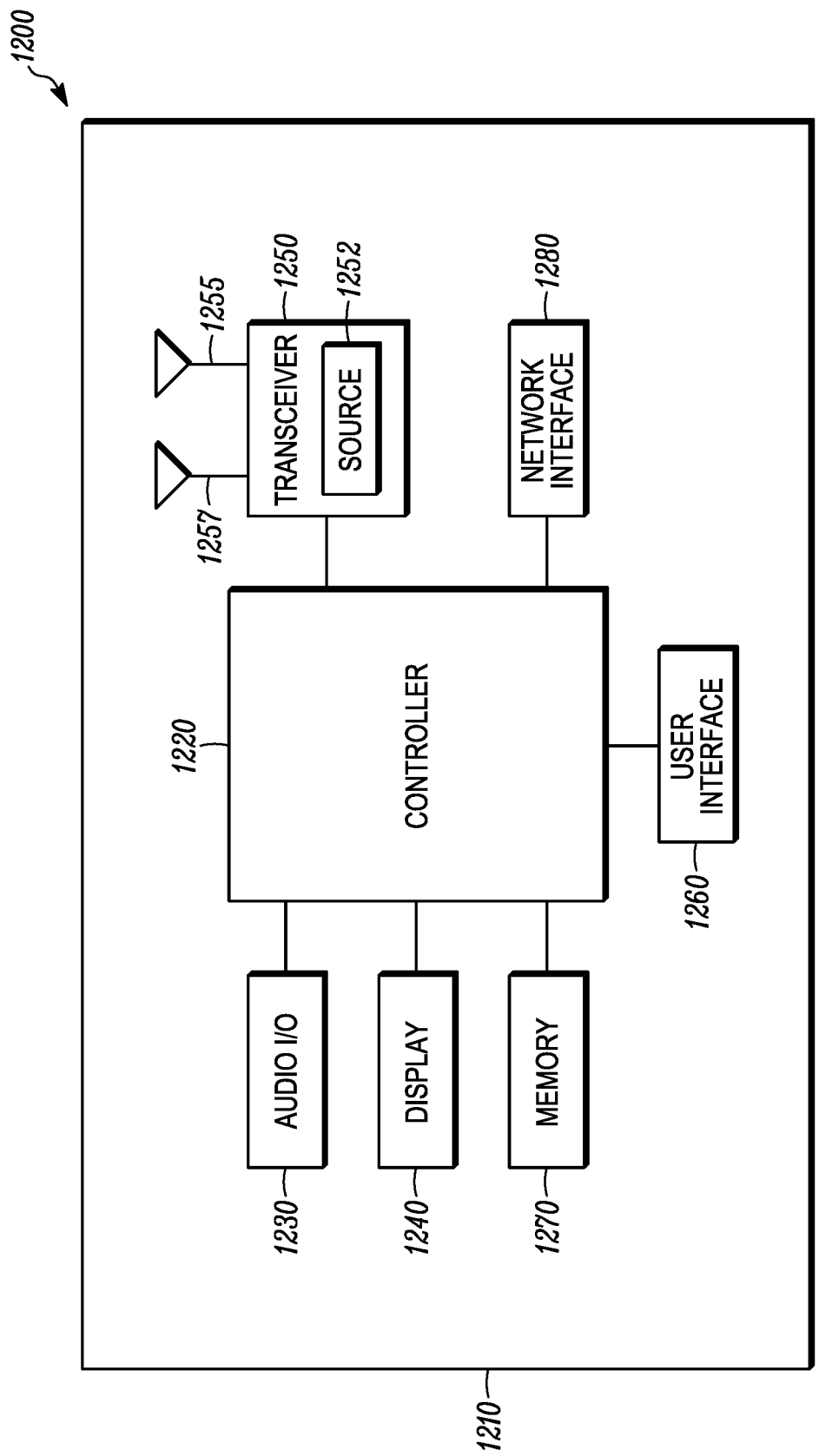
FIG. 12 is an example block diagram of an apparatus according to a possible embodiment.

FIG. 12 is an example block diagram of an apparatus 1200, such as the transmitting device 110, according to a possible embodiment. The apparatus 1200 can be a base station, a UE, or any other transmitting and/or receiving apparatus. The apparatus 1200 can include a housing 1210, a controller 1220 coupled to the housing 1210, audio input and output circuitry 1230 coupled to the controller 1220, a display 1240 coupled to the controller 1220, a transceiver 1250 coupled to the controller 1220, an antenna array including plurality of antennas, such as antennas 1255 and 1257, coupled to the transceiver 1250, a user interface 1260 coupled to the controller 1220, a memory 1270 coupled to the controller 1220, and a network interface 1280 coupled to the controller 1220. The apparatus 1200 can perform the methods described in all the embodiments.

The display 1240 can be a viewfinder, a liquid crystal display (LCD), a light emitting diode (LED) display, a plasma display, a projection display, a touch screen, or any other device that displays information. The transceiver 1250 can include a transmitter and/or a receiver. The transceiver 1250 can also include a signal source or the signal source can be located elsewhere on the apparatus 1200. The plurality of antennas 1255 and 1257 can be an antenna array. A transmission line (not shown) can be coupled between the signal source 1252 and the antenna array. The transmission line can have a transmission line impedance. The plurality of antennas 1255 and 1257 can include two or more antennas. The antennas 1255 and 1257 can be mutually coupled in that voltage or current applied to one antenna element induces a voltage or current on another antenna element in the antenna array. The audio input and output circuitry 1230 can include a microphone, a speaker, a transducer, or any other audio input and output circuitry. The user interface 1260 can include a keypad, a keyboard, buttons, a touch pad, a joystick, a touch screen display, another additional display, or any other device useful for providing an interface between a user and an electronic device. The network interface 1280 can be a Universal Serial Bus (USB) port, an Ethernet port, an infrared transmitter/receiver, an IEEE 1398 port, a WLAN transceiver, or any other interface that can connect an apparatus to a network, device, or computer and that can transmit and receive data communication signals. The memory 1270 can include a random access memory, a read only memory, an optical memory, a flash memory, a removable memory, a hard drive, a cache, or any other memory that can be coupled to a wireless communication device.

The apparatus 1200 or the controller 1220 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1270 or elsewhere on the apparatus 1200. The apparatus 1200 or the controller 1220 may also use hardware to implement disclosed operations. For example, the controller 1220 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1220 may be any controller or processor device or devices capable of operating a wireless communication device and implementing the disclosed embodiments. While the controller 1220 is illustrated as one block and operations of the controller 1220 can be performed in one element, the controller 1220 can alternately be distributed between different elements of the apparatus 1200 as well as distributed through cloud computing. For example, different controllers can exist on the apparatus 1200 to perform different operations for different elements on the apparatus 1200, a master controller can perform all of the operations of the apparatus 1200, and/or a master controller can perform some overall operations and distributed controllers can perform other operations for other elements on the apparatus 1200.

In operation, the memory 1270 can store a codebook including a plurality of precoders. The controller 1220 can receive a plurality of precoders from the codebook in the memory 1270.

The controller 1220 can transform each precoder of the plurality of precoders to a transformed precoder such that the transmit power for each transformed precoder is equal to the transmit power for each of the other transformed precoders of the plurality of precoders. The transmit power can be expressed as a quadratic form with respect to the corresponding precoder. The quadratic form can be based on the transmission line impedance. The quadratic form can also be based on an impedance matrix of the antenna array, a matching network between the signal source and the antenna array, an impedance of a transmission line, a signal source impedance, and/or a length of the transmission line.

Each precoder can be transformed by scaling each precoder by an inverse square root of a transmit power that results from the corresponding precoder before scaling is applied. Scaling can include normalizing a precoder into a normalized precoder based on the quadratic form. Also or alternately, each precoder can be transformed by multiplying each precoder by a transformation matrix such that the resulting set of precoders each map to antenna patterns having the same power. The transformation matrix can be based on an impedance matrix of the antenna array seen at the signal source as a function of the transmission line length, the transmission line impedance, and an impedance of the antenna array.

The controller 1220 can receive a signal from the signal source 1252. The controller 1220 can apply a transformed precoder of the plurality of transformed precoders to the signal to generate a precoded signal for transmission over a physical channel. The transceiver 1250 can transmit the precoded signal.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method comprising:
   receiving a plurality of precoders from a codebook in a transmitter having an antenna array;
   transforming each precoder of the plurality of precoders to a transformed precoder such that the transmit power for each transformed precoder is equal to the transmit power for each of other transformed precoders of the plurality of precoders, where the transmit power is expressed as a quadratic form with respect to the corresponding precoder, where the quadratic form is based on a transmission line impedance of a transmission line between a signal source and the antenna array;
   receiving a signal from the signal source;
   applying a transformed precoder of the plurality of transformed precoders to the signal to generate a precoded signal for transmission over a physical channel; and
   transmitting the precoded signal.

2. The method according to claim 1, wherein the quadratic form is also based on an impedance matrix of the antenna array.

3. The method according to claim 1, wherein the quadratic form is also based on a matching network between the signal source and the antenna array.

4. The method according to claim 1, wherein the quadratic form is also based on an impedance of the antenna array, a signal source impedance, and length of the transmission line.

5. The method according to claim 1, wherein each precoder is transformed by scaling each precoder by an inverse square root of a transmit power that results from the corresponding precoder before scaling is applied.

6. The method according to claim 5, wherein scaling comprises normalizing a precoder into a normalized precoder based on the quadratic form.

7. The method according to claim 5, further comprising transmitting a scaling factor used for the scaling.

8. The method according to claim 1, wherein each precoder is transformed by multiplying each precoder by a transformation matrix such that the resulting set of precoders each map to antenna patterns having the same power.

9. The method according to claim 8, wherein the transformation matrix is based on an impedance matrix of the antenna array seen at the signal source as a function of the transmission line length, the transmission line impedance, and an impedance of the antenna array.

10. The method according to claim 1, wherein the transformation equalizes the transmit power for all of the plurality of precoders.

11. The method according to claim 1, wherein transforming transforms the precoders to equal energy precoders when transmission lines are used between a source of the signal and the antenna array.

12. The method according to claim 1, wherein both data symbol precoders and reference symbol precoders are transformed by the same transformation.

13. The method according to claim 12, further comprising:
   receiving a precoded signal including reference symbols;
   estimating channels for the reference symbols;
   estimating a channel for the data symbols by taking an inner product of a conjugate of a data symbol precoder and the reference symbol channel estimates; and
   demodulating received data symbols based on the estimated channel.

14. The method according to claim 1, further comprising expressing the transmit power as a quadratic form with respect to the corresponding precoder, where the quadratic form is based on a transmission line impedance of a transmission line between a signal source and the antenna array.

15. The method according to claim 1, wherein transforming each precoder comprises transforming each precoder of the plurality of precoders to a transformed precoder with transmit power expressed as a quadratic form based on a transmission line impedance of a transmission line between a signal source and the antenna array, with respect to the corresponding precoder, for each transformed precoder, equal to the transmit power expressed as a quadratic form based on a transmission line impedance of a transmission line between a signal source and the antenna array, with respect to the corresponding precoder, for each of other transformed precoders of the plurality of precoders.

16. An apparatus comprising:
an antenna array;
a transceiver coupled to the antenna array;
a signal source coupled to the transceiver;
a transmission line coupled between the signal source and the antenna array, the transmission line having a transmission line impedance;
a memory to store a codebook including a plurality of precoders; and
a controller coupled to the transceiver and the memory, the controller to
receive a plurality of precoders from the codebook,
transform each precoder of the plurality of precoders to a transformed precoder such that the transmit power for each transformed precoder is equal to the transmit power for each of other transformed precoders of the plurality of precoders, where the transmit power is expressed as a quadratic form with respect to the corresponding precoder, where the quadratic form is based on the transmission line impedance,
receive a signal from the signal source, and
apply a transformed precoder of the plurality of transformed precoders to the signal to generate a precoded signal for transmission over a physical channel,
wherein the transceiver transmits the precoded signal.

17. The apparatus according to claim 16, wherein the quadratic form is also based on at least one selected from an impedance matrix of the antenna array, a matching network between the signal source and the antenna array, an impedance of the antenna array, a signal source impedance, and length of the transmission line.

18. The apparatus according to claim 16, wherein each precoder is transformed by scaling each precoder by an inverse square root of a transmit power that results from the corresponding precoder before scaling is applied.

19. The apparatus according to claim 18, wherein scaling comprises normalizing a precoder into a normalized precoder based on the quadratic form.

20. The apparatus according to claim 16, wherein each precoder is transformed by multiplying each precoder by a transformation matrix such that the resulting set of precoders each map to antenna patterns having the same power.

21. The apparatus according to claim 20, wherein the transformation matrix is based on an impedance matrix of the antenna array seen at the signal source as a function of the transmission line length, the transmission line impedance, and an impedance of the antenna array.

22. The apparatus according to claim 16, wherein the controller transforms the precoders to equal energy precoders when transmission lines are used between a source of the signal and the antenna array.

* * * * *